US009452383B2

(12) United States Patent
Bowen et al.

(10) Patent No.: US 9,452,383 B2
(45) Date of Patent: Sep. 27, 2016

(54) MEMBRANE SEPARATION ELEMENT AND PROCESS RELATING THERETO

(71) Applicant: UOP, LLC, Des Plaines, IL (US)

(72) Inventors: Travis C. Bowen, Crystal Lake, IL (US); Parag Jain, Schaumburg, IL (US); Ram Ganesh Rokkam, Visakhapatnam (IN)

(73) Assignee: UOP LLC, Des Plaines, IL (US)

( * ) Notice: Subject to any disclaimer, the term of this patent is extended or adjusted under 35 U.S.C. 154(b) by 67 days.

(21) Appl. No.: 14/265,790

(22) Filed: Apr. 30, 2014

(65) Prior Publication Data

US 2015/0314231 A1   Nov. 5, 2015

(51) Int. Cl.
*B01D 53/22* (2006.01)

(52) U.S. Cl.
CPC .......... *B01D 53/22* (2013.01); *B01D 2053/221* (2013.01); *B01D 2313/14* (2013.01)

(58) Field of Classification Search
CPC ............. B01D 53/22; B01D 2053/221; B01D 2313/14; B01D 2313/143; B01D 2313/146
See application file for complete search history.

(56) References Cited

U.S. PATENT DOCUMENTS

| | | | |
|---|---|---|---|
| 3,354,618 A * | 11/1967 | Dounoncos | .......................... 96/7 |
| 3,878,086 A | 4/1975 | Haswell et al. | |
| 4,213,858 A * | 7/1980 | Boberg | .................. B01D 61/28 210/321.74 |
| 4,906,372 A * | 3/1990 | Hopkins | .................. 210/321.74 |
| 5,061,297 A * | 10/1991 | Krasberg | ............................. 95/1 |
| 5,069,793 A | 12/1991 | Kaschemekat et al. | |
| 5,096,584 A | 3/1992 | Reddy et al. | |
| 5,137,637 A * | 8/1992 | Korin | ............................. 210/634 |
| 5,236,665 A * | 8/1993 | Mathewson et al. | ............ 422/46 |
| 5,275,726 A | 1/1994 | Feimer et al. | |
| 6,350,399 B1 | 2/2002 | Cook et al. | |
| 7,097,800 B2 | 8/2006 | Vigna et al. | |
| 7,138,045 B2 | 11/2006 | Sferrazza | |
| 7,338,601 B2 | 3/2008 | Schott et al. | |
| 8,007,670 B2 * | 8/2011 | Connors, Jr. | ............. 210/321.61 |
| 8,182,694 B2 * | 5/2012 | Childs et al. | ................... 210/654 |
| 8,313,651 B2 | 11/2012 | Childs et al. | |
| 8,366,929 B2 | 2/2013 | Masutani et al. | |
| 8,454,724 B2 | 6/2013 | Sharma et al. | |
| 2012/0117789 A1 * | 5/2012 | Liang et al. | .................. 29/592.1 |
| 2014/0262144 A1 * | 9/2014 | Erb et al. | .......................... 165/60 |
| 2015/0190758 A1 * | 7/2015 | Gadgaard et al. | .................... 96/7 |

FOREIGN PATENT DOCUMENTS

WO   2004112945   12/2004

OTHER PUBLICATIONS

Eriksson, "New Design Feed Channel Spacer in Spiral Wound Elements for Pretreatment Cost Reduction", U.S. Dept. of Interior Bureau of Reclamation Technical Services Center Water Treatment Engineering and Research Group, Sep. 1998, No. 45, 57 pages.

Keong, "Feed Spacer of Spiral Wound Membrane Module for Nanofiltration and Reverse Osmosis: Modeling, Simulation and Design", Doctor of Philosophy Thesis Paper, Feb. 2007, p. 54 pages.

*Primary Examiner* — Anthony Shumate (57) ABSTRACT

One exemplary embodiment is a membrane separation element. The membrane separation element can include a membrane and a feed spacer positioned adjacent to the membrane. The feed spacer may include a first layer, a second layer, and a third layer. Usually, a plurality of fibers of the second layer only touches a plurality of fibers of the first and third layers.

10 Claims, 4 Drawing Sheets

(56) References Cited

OTHER PUBLICATIONS

Li et al., "Novel Spacers for Mass Transfer Enhancement in Membrane Separations", Journal of Membrane Science, May 5, 2005, vol. 253, No. 1-2, pp. 1-12.

Schwinge et al., "Novel Spacer Design Improves Observed Flux", Journal of Membrane Science, May 5, 2004, vol. 229, pp. 53-61.

Harness et al., "UOP Separex Membrane Systems", Apr. 2012, Presented at 2012 AIChE Spring Meeting, Houston, Texas, p. 65.

* cited by examiner

FIG. 5

MEMBRANE SEPARATION ELEMENT AND PROCESS RELATING THERETO

FIELD OF THE INVENTION

The present invention generally relates to a membrane separation element, and a process relating thereto.

DESCRIPTION OF THE RELATED ART

Often, a variety of commercial processes rely on fluid separation techniques in order to separate one or more fluid components from a mixture. In particular, such processes may involve the separation of liquid mixtures, the separation of vapors or gases from liquids, or the separation of intermingled gases.

As an example, carbon dioxide, commonly categorized as an acid gas, is frequently found in natural gas streams, such as in levels as high as 80%, by mole. In combination with water, carbon dioxide can be highly corrosive and rapidly damage or destroy pipelines and associated processing equipment. Consequently, such processing has typically required either the use of exotic and more costly materials of construction or the effective isolation or removal of carbon dioxide from the process stream.

While a variety of acid gas removal technologies, including absorption processes, cryogenic processes, and adsorption processes are available, generally fluid separation via the use of membranes, e.g., thin semipermeable membranes that selectively separate some fluid compounds or constituents from others, has experienced increased popularity for such fluid separation applications. Usually, the membrane separations are based on relative permeabilities of various components of the fluid mixture, resulting in a gradient driving force, based on pressure, partial pressure, concentration and temperature. Such selective permeation can result in the separation of the fluid mixture into portions commonly referred to as "retentate" or "residual", e.g., generally composed of slowly permeable components, and "permeate", e.g., generally composed of faster migrating components.

Often, spiral-wound membranes are used in natural gas upgrading, primarily bulk carbon dioxide removal. These spiral-wound membranes may have multiple membrane leaves in each spiral-wound membrane element. Spiral-wound and other flat-sheet type membrane elements often use a feed spacer to separate membranes to create a feed channel. Such a feed spacer can serve to improve mixing by increasing turbulence in the feed flow. Usually, the feed spacer has a net-like structure, such as a diamond pattern. The feed spacer can include two layers of strands arranged with the strands in one layer at an angle of 90° relative to the strands in the second layer. Typically, the feed spacer is positioned so that the direction of bulk feed flow is at an angle of 45° relative to the strands in each layer. Often, the cylindrical strands are approximately one-half of the feed channel height.

This type of feed spacer can impart turbulence on the feed to minimize membrane boundary layer effects, but the membrane gas separation performance may still be affected by low feed velocity at the boundary layers. Membrane performance can be reduced due to the accumulation in the boundary layer of lower-permeating components in the feed mixture. This is known as concentration polarization. In addition, a feed side pressure drop through each membrane element is sometimes higher than desired due to friction losses as the feed passes the feed spacer structure.

In addition to providing a feed channel, a feed spacer should provide thorough mixing of the feed with minimal increase in pressure drop in the feed channel. One exemplary feed spacer system promotes eddies and vortices near the membrane surface to minimize boundary layer thickness and disperse components near the boundary layers by feeding the gases at sufficiently high velocities and having traverse strands of the feed spacer in contact with the membrane surface. A vortex can be formed near the membrane surface downstream of the strand. Another exemplary feed spacer can have alternating positions of strands with transverse components within the feed channel, such as a net-like diamond strand pattern, to create as much of a tortuous flow path as possible. As such, along the bulk flow direction, the feed alternately passes over a bottom strand, then under a top strand, then over another bottom strand, and so on. Unfortunately, a disadvantage of providing more thorough mixing is increasing feed-side pressure drop, and this elevated pressure drop creates design problems. Thus, there is a desire to provide a feed spacer with improved mixing without the drawback of elevated pressure drop.

SUMMARY OF THE INVENTION

One exemplary embodiment is a membrane separation element. The membrane separation element can include a membrane and a feed spacer positioned adjacent to the membrane. The feed spacer may include a first layer, a second layer, and a third layer. Generally, the first layer includes a plurality of fibers. Each fiber of the plurality of fibers can have a diameter and a length, and the fibers of the first layer may be arranged substantially parallel with respect to their lengths to one another and positioned with respect to their lengths at a skewed angle to a bulk flow. Typically, the second layer includes a plurality of fibers. Each fiber of the plurality of fibers can have a diameter and a length, and the fibers of the second layer may be arranged substantially parallel with respect to their lengths to one another and positioned with respect to their lengths to offset by about 45-about 135° at least one fiber of the first layer. Often, a third layer includes a plurality of fibers. Each fiber of the plurality of fibers can have a diameter and a length, and the respective lengths of the plurality of fibers of the third layer may be generally aligned with the respective lengths of the plurality of fibers of the first layer. Usually, the plurality of fibers of the second layer only touches the plurality of fibers of the first and third layers.

Another exemplary embodiment is a membrane separation element. The membrane separation element may include a membrane and a feed spacer positioned adjacent to the membrane. The feed spacer can include a first layer, a second layer, and a third layer. Generally, the first layer includes a plurality of fibers. Each fiber of the plurality of fibers can have a diameter and a length, and the fibers of the first layer may be arranged substantially parallel with respect to their lengths to one another and positioned with respect to their lengths about 80-about 100° to a bulk flow. Typically, a second layer includes a plurality of fibers. Each fiber of the plurality of fibers may have a diameter and a length, and the fibers of the second layer can be arranged substantially parallel with respect to their lengths to one another and positioned with respect to their lengths about 112-about 158° to at least one fiber of the first layer. Usually, a third layer has a plurality of fibers. Each fiber of the plurality of fibers can have a diameter and a length, and the fibers of the third layer may be arranged substantially parallel with respect to their lengths to one another and positioned with respect to their lengths about 45-about 135° to at least one fiber of the second layer. Sometimes, a fourth layer includes a plurality of fibers. Each fiber of the plurality of fibers can have a diameter and a length, and the respective lengths of the plurality of fibers of the fourth layer may be generally aligned with the respective lengths of the plurality of fibers of the first layer.

A further exemplary embodiment can be a process for treating a stream in a gas phase, containing an undesirable amount of a gas species. The process may include passing the gas stream to a membrane unit. Generally, the membrane unit includes an elongated housing, and a membrane separation element contained within the elongated housing. The membrane separation element can include a membrane, and a feed spacer positioned adjacent to the membrane. Often, the feed spacer includes at least three layers, and the layers are fused directly or indirectly together uniting the layers into an integral feed spacer.

The embodiments disclosed herein can provide a feed spacer utilizing at least three layers of reduced diameter fibers to create the desired turbulence at the surface of the membrane. Additionally, the reduced diameter fibers can minimize the increase in pressure drop. Thus, the multilayer feed spacer can be particularly advantageous for gas phase separations, particularly separating carbon dioxide from natural gas.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. A "stream" may also be or include substances, e.g., fluids or substances behaving as fluids, other than hydrocarbons, such as air, nitrogen, carbon dioxide, or hydrogen.

As used herein, the term "zone" can refer to an area including one or more equipment items and/or one or more sub-zones. Equipment items can include one or more reactors or reactor vessels, heaters, separation elements, exchangers, pipes, pumps, compressors, and controllers. Additionally, an equipment item, such as a reactor, dryer, or vessel, can further include one or more zones or sub-zones.

As used herein, the term "vapor" can refer to a gas or a dispersion that may include or consist of one or more hydrocarbons.

As used herein, the term "fiber" can refer to the basic element of fabrics and other structures. A fiber is characterized by having a length of at least about 10 times, or even about 100 times, its width or diameter. A fiber may be made of a natural polymer, e.g., a cellulose, a synthetic polymer, e.g., a polyester, a polypropylene, a polyethylene, a polyurethane, or a polyvinyl, or a mineral, e.g., a glass.

As used herein, the term "web" or "fiber web" can refer to a layer having a structure of individual fibers or threads that are interlaid.

As used herein the term "meltblown fibers" can refer to fibers formed by extruding a molten thermoplastic material through a plurality of fine, usually circular, die capillaries as molten threads or filaments into converging, usually hot, gas (e.g., air) streams that attenuate the filaments of molten thermoplastic material to reduce their diameter, which may be to microfiber diameter. Generally, the webs described herein can be formed by melt extrusion.

As used herein, the term "gas phase" can refer to a phase containing at least about 95%, preferably about 99%, by mole, of one or more gas species.

As used herein, the term "membrane" can refer to a structure, either natural or synthetic, that may be used to separate components of a fluid. The membrane may be a member of a larger element, and take any suitable shape, such as a sheet, prism, or tube.

As used herein, the term "skewed" can refer to an angle that is not perpendicular, e.g., 90°, or straight, e.g., 180°.

As used herein, the term "substantially uniform diameter" can mean the diameters of several fibers are mostly the same except for slight variations due to, e.g., a manufacturing process.

As used herein, the term "integral feed spacer" means various layers of fibers in a feed spacer that are either fused directly together or indirectly, such as a second layer fused directly with a first layer and a third layer, and the third layer fused directly with the second layer and a fourth layer. Thus, the first and fourth layers are fused indirectly together via the second and third layers. Thus, the layers may be fixed with respect to one another.

DETAILED DESCRIPTION

Membranes have been widely used in two carbon dioxide ($CO_2$) removal applications: natural gas sweetening and enhanced oil recovery. In such applications, carbon dioxide can be removed from an associated natural gas stream and reinjected into the oil well to enhance oil recovery. Generally, the natural gas stream includes one or more C1-C4 hydrocarbons, usually methane, and other gases such as nitrogen and hydrogen sulfide. These separations can occur in a gas phase, although membranes may be used in other fluid phases, such as liquid-liquid or vapor.

Typically, a membrane used for carbon dioxide removal is polymer based, e.g., a cellulose acetate, a polyimide, a polyamide, a polysulfone, a polycarbonate, or a polyetherimide, particularly a cellulose acetate polymer or a polyimide polymer. Often, a cellulose acetate membrane is used for carbon dioxide removal from natural gas.

Sometimes, a membrane used for carbon dioxide removal does not operate as a filter, where small molecules are separated from larger ones through a medium with pores. Instead, the nonporous membrane may operate on the principle of solution-diffusion. The carbon dioxide first can dissolve into the membrane and then diffuse through it. Because the membrane does not have pores, it typically does not separate only on the basis of molecular size. Rather, although not wanting to be bound by theory, the membrane separates based on how well different compounds dissolve into the membrane and then diffuse through it.

Because carbon dioxide, hydrogen, helium, hydrogen sulfide, and water vapor, for example, typically permeate quickly, they may be referred to as "fast" gases. Carbon monoxide, nitrogen, methane, ethane and other hydrocarbons typically permeate less quickly and may be referred to as "slow" gases. Generally, the membrane allows selective removal of fast gases from slow gases. As an example, as carbon dioxide is removed from a natural gas stream, water and hydrogen sulfide are removed at the same time; but methane, ethane, and higher hydrocarbons are removed at a much lower rate. Both permeability and selectivity can be important considerations when selecting a membrane. The higher the permeability, the less membrane area may be required for a given separation and therefore the lower the system cost. The higher the selectivity, the lower the losses of hydrocarbons as carbon dioxide can be removed and therefore the higher the volume of salable product.

Often, a gas separation membrane is manufactured in the form of one or more flat sheets. The flat sheets are typically combined into spiral-wound elements that are orientated horizontally. In typical spiral-wound arrangements, two flat sheets or members of membrane with a permeate spacer in between are joined, e.g., glued, along three of their sides to form an envelope, i.e., a "leaf", that is open at one end. A feed gas can enter feed spacers separating the envelopes and pass through the side of the membrane. As the gas travels through the membrane, often the permeate, such as carbon dioxide, exits through a permeate tube. The driving forces for such transport can be high feed pressures. The permeate gas may enter the permeate tube, such as through holes formed in the tube, and travel through the tube to exit the membrane unit. Gas on the feed side that does not permeate may leave through the side of the membrane separation element opposite the feed position.

Usually, the membranes, once produced into membrane separation elements, are typically formed into membrane units, e.g., a tube containing a plurality of membrane separation elements. Units can be used singly or, more commonly, interconnected in series or parallel arrangements, or arrays. Generally, an installation may have from at least two up to several hundred units in an array. Typically, each unit has an input, e.g., feed stream, an output or residual stream that contains the substances that did not pass through the membrane separation element, and a permeate stream containing the substances that do pass through, e.g., permeate through, the membrane separation element.

The conditions for separation can include a pressure of about 3,000-about 21,000 kPa, and a temperature of about 20-about 60° C. In one exemplary application, the feed stream can include methane, ethane, propane, hydrogen sulfide, and carbon dioxide. The carbon dioxide in the feed may be present in amounts of more than about 10%, about 25%, or even about 50%, by mole.

Figure 1:
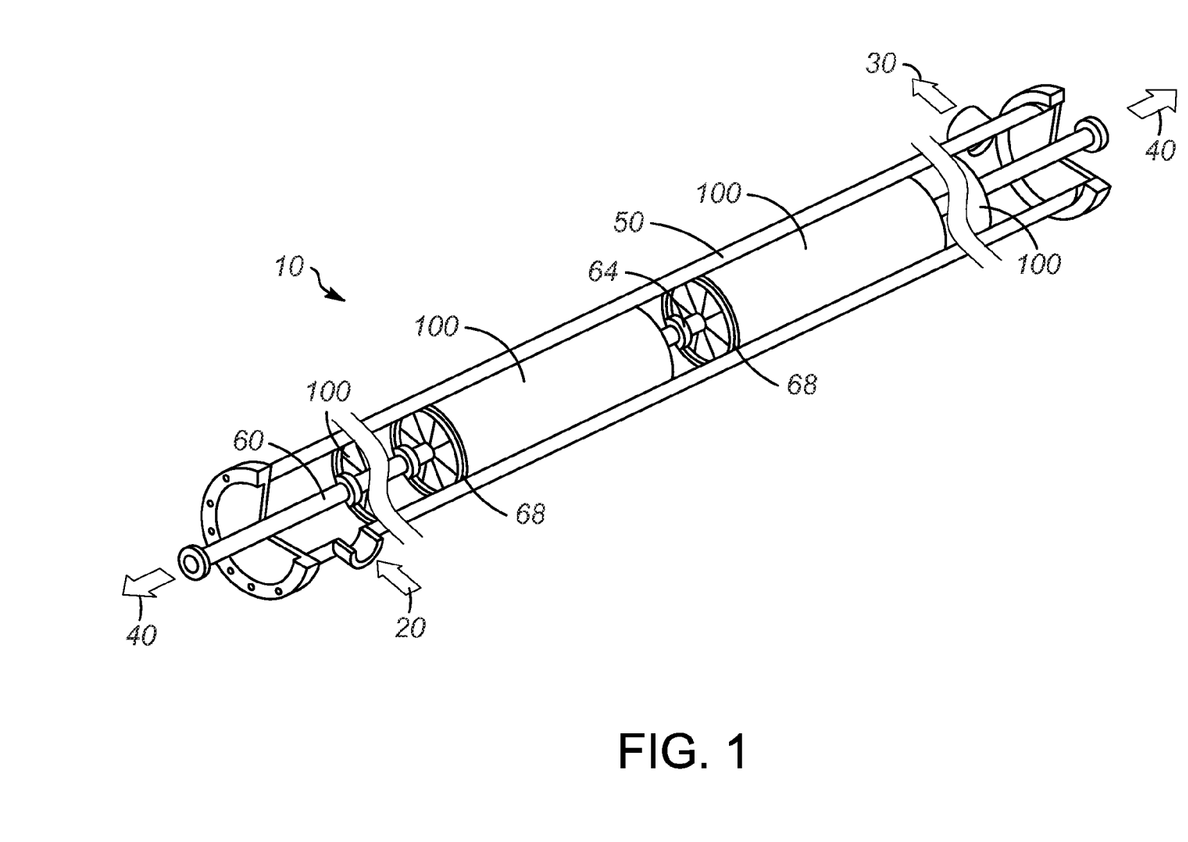
FIG. 1 is a cut-away, perspective view of an exemplary membrane unit.

Referring to FIG. 1, an exemplary membrane unit 10 can include an elongated housing 50 surrounding several membrane separation elements 100, which in this exemplary embodiment four membrane separation elements 100 are partially or wholly depicted. It should be understood that the elongated housing 50 can contain any suitable number of membrane separation elements 100. A permeate tube 60 may extend through the elongated housing 50 with one or more sections being coupled with one or more permeate tube clamps 64. Each membrane separation element 100 may have at least one seal 68 at opposing ends.

In operation, a feed 20, in, e.g., a gas phase, containing an undesirable amount of a species, such as carbon dioxide gas, may be provided at an end of the elongated housing 50. The feed or gas stream 20 passing through the membrane separation elements 100 may exit as a residue stream 30 with the undesirable gas species removed. As hereinafter described, the undesired gas species migrates through the membrane separation elements 100 toward their respective centers until entering the permeate tube 60, and exit either end as permeate streams 40.

Figure 2:
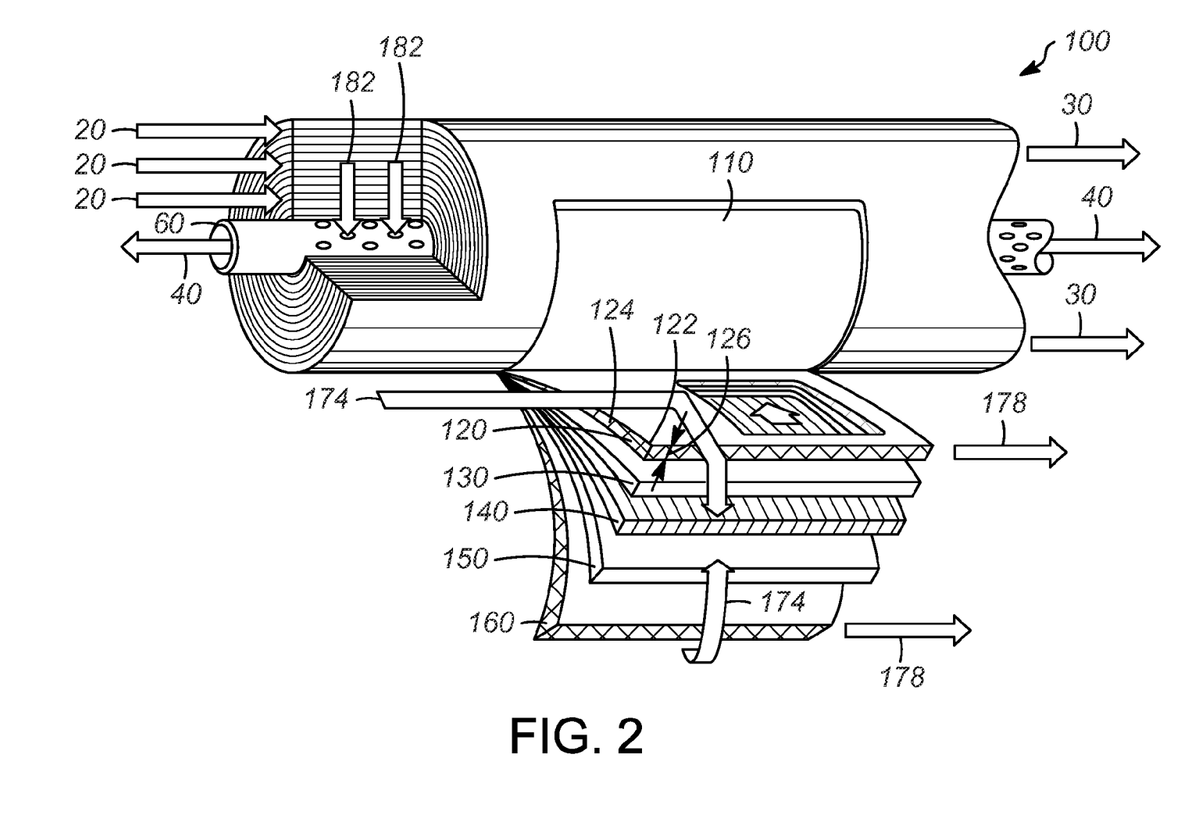
FIG. 2 is a cut-away, perspective view of a membrane separation element.

Referring to FIG. 2, a membrane separation element 100 is depicted in more detail illustrating various members. Usually, the membrane separation element 100 includes several members, such as a first membrane 110, a first feed spacer 120, a second membrane 130, a permeate spacer 140, a third membrane 150, and a second feed spacer 160. These members 120, 130, 140, 150, and 160 can be in the form of sheets, and the sheets may be repeated and spirally wound about the permeate tube 60. The first membrane 110 can correspond to the third membrane 150 to form a portion of another leaf. In one exemplary embodiment, the first membrane 110 is positioned adjacent to a first layer of the feed spacer 120 and the second membrane 130 is positioned adjacent to a third or a fourth layer of the feed spacer 120. The first, third, and fourth layers of the feed spacer 120 are hereinafter described.

In operation, the gas stream 20 can enter the end of the membrane separation element 100. As the feed gas stream 20 passes through the membrane separation element 100, the feed gas stream 20 may pass through the feed spacer sheets, such as the first feed spacer 120 and the second feed spacer 160. As the gases migrate, an internal bulk flow 174 may pass through the feed spacers 120 and 160 and respectively through the second membrane 130 and the third membrane 150. Undesirably, residual gases may accumulate on the surfaces of the membranes 130 and 150. Thus, the feed spacers can be manufactured to impart turbulence to minimize such accumulation. Generally, the feed spacers 120 and 160 can be substantially the same, so only the first feed spacer 120 is described in detail.

Usually, the first feed spacer 120 has an edge 122 forming a channel 124 with a height 126. An internal residual flow 178 may pass parallel to the feed spacers 120 and 160, while an internal permeate flow 182 may pass through the permeate spacer 140 toward the permeate tube 60. Permeate streams 40 can pass out either end of the tube 60, as described above, while the residue streams 30 can pass parallel and outside of the permeate tube 60.

The feed spacers can be comprised of various webs or layers of fibers. Each layer or web may include at least one or a plurality of fibers arranged with respect to their lengths in a parallel manner to one another. A web can be fibers formed by melt extrusion, and another web may be formed thereon with its fibers in parallel, and aligned or offset to fibers previously formed. Typically, the feed spacer includes at least three or four webs or layers. The feed spacers can be made from any suitable material, such as polyethylene and/or propylene.

Figure 3:
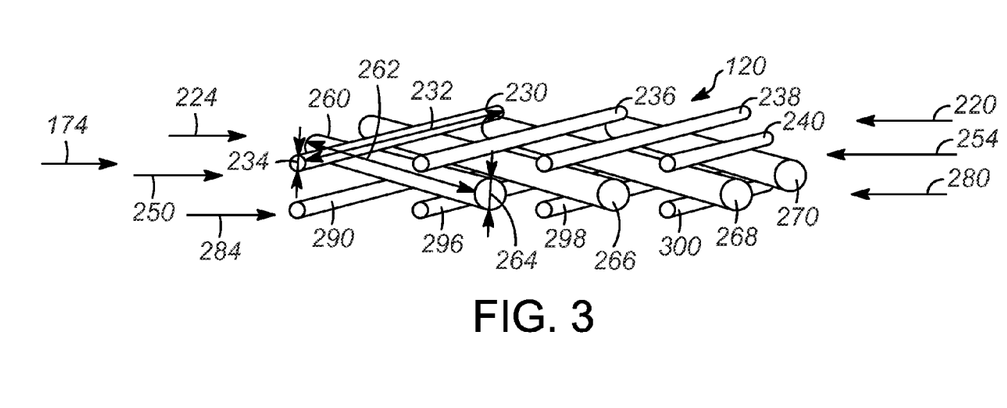
FIG. 3 is a schematic, perspective view of an exemplary feed spacer depicting several layers.

Referring to FIG. 3, one exemplary embodiment of the feed spacer 120 can include a first web or layer 220 including at least one or a plurality of fibers 224, such as a first fiber 230, a second fiber 236, a third fiber 238, and a fourth fiber 240; a second web or layer 250 including at least one or a plurality of fibers 254, such as a first fiber 260, a second fiber 266, a third fiber 268, and a fourth fiber 270; and a third web or layer of fibers 280 including at least one or a plurality of fibers 284, such as a first fiber 290, a second fiber 296, a third fiber 298, and a fourth fiber 300. In this exemplary embodiment, the feed spacer 120 may include three layers. Although four fibers are depicted in each layer 220, 250, and 280, generally numerous fibers, such as hundreds or thousands of fibers, are present in each layer 220, 250, and 280.

Often, the plurality of fibers 224 of the first layer 220 are arranged with respect to their lengths in a substantially parallel manner to one another. Usually, each fiber is substantially identical with a uniform diameter. As such, only a single fiber 230 is described in detail. The fiber 230 can have a length 232 and a diameter 234. A ratio of the diameter 234 of the fiber 230 to the height 126 of the channel 124, as depicted in FIG. 2, may be about no more than about 0.4:1, desirably about 0.15:1-about 0.35:1, such as about 0.25:1. Typically, the fiber 230 is skewed with respect to its length 232 to the bulk flow 174. In other exemplary embodiments, the length 232 of the fiber 260 can be orientated about 292-about 338°, desirably about 305-about 325°, such as about 315°, with respect to the internal bulk flow 174. The plurality of fibers 224, as well as other pluralities of fibers, hereinafter described, can be arranged at any suitable angle, with larger angles creating more turbulence and smaller angles creating less pressure drop.

Usually, the plurality of fibers 254 of the second layer 250 are arranged with respect to their lengths in a substantially parallel manner. Often, each fiber is substantially identical with a uniform diameter. As such, only a single fiber 260 is described in detail. Typically, the fiber 260 has a length 262 and a diameter 264. Generally, the fiber 260 is skewed to the bulk flow 174 with respect to its length 262. Usually, a ratio of the diameter 264 of the fiber 260 to the height 126 of the channel 124, as depicted in FIG. 2, is at least about 0.3:1, desirably about 0.4:1-about 0.6:1, such as about 0.5:1. Usually, the diameter 264 of the fiber 260 is about twice the diameter 234 of the fiber 230. Typically, the fiber 260 is skewed with respect to its length 262 to the bulk flow 174. In other exemplary embodiments, the length 262 of the fiber 260 can be orientated about 22-about 68°, desirably about 35-about 55°, such as about 45°, with respect to the internal bulk flow 174, or about 45-about 135°, desirably about 80-about 100°, such as about 90°, with at least one fiber 224 of the first layer 220.

It should be understood that the angles of the fiber lengths of the layers 220, 250, and 280 relative to the bulk flow 174 can be reversed. As an example, the plurality of fibers 224 with respect to their lengths can be orientated about 22-about 68°, desirably about 35-about 55°, such as about 45°, with respect to the internal bulk flow 174, and the plurality of fibers 254 with respect to their lengths can be orientated about 292-about 338°, desirably about 305-about 325°, such as about 315°, with respect to the internal bulk flow 174. Additionally, the angle of the fiber lengths of the second layer 250 as compared to the fiber lengths of the first layer 220 can be about 135-about 45°, about 100-about 80°, depending on which side the angle is measured, as a fiber from the second layer 250 crosses a fiber of the first layer 220. Although the fibers in each layer 220, 250, and 280 have been described as substantially identical, it should be understood that the fibers may be different in each layer. Moreover, the fibers of the layers 220 and 280 may be different from one layer to the next.

Generally, the plurality of fibers 284, namely, the first fiber 290, the second fiber 296, the third fiber 298, and the fourth fiber 300, of the third layer 280 correspond and are aligned with the plurality of fibers 224, namely, the first fiber 230, the second fiber 236, the third fiber 238, and the fourth fiber 240. Thus, the fibers 284 of the third layer 280 are generally aligned on the fibers 224 of the first layer 220. Additionally, the plurality of fibers 254 of the second layer 250 can only touch the plurality of fibers 224 and 284 of the first and third layers 220 and 280. Typically, these touching fibers are fused to prevent shifting of layers 220, 250, and 280. Shifting layers can reduce feed channels and subsequently result in increased pressure drops.

Figure 4:
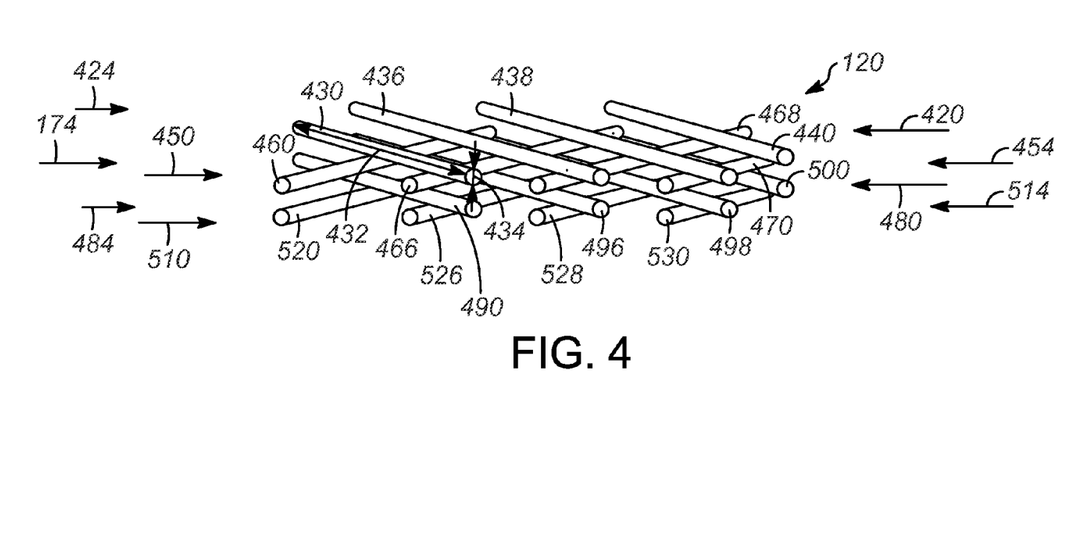
FIG. 4 is a schematic, perspective view of another exemplary feed spacer depicting several layers.

Referring to FIG. 4, another exemplary embodiment of the feed spacer 120 can include a first web or layer 420 including at least one or a plurality of fibers 424, such as a first fiber 430, a second fiber 436, a third fiber 438, and a fourth fiber 440; a second web or layer 450 including at least one or a plurality of fibers 454, such as a first fiber 460, a second fiber 466, a third fiber 468, and a fourth fiber 470; a third web or layer of fibers 480 including at least one or a plurality of fibers 484, such as a first fiber 490, a second fiber 496, a third fiber 498, and a fourth fiber 500; and a fourth web or layer of fibers 510 including at least one or a plurality of fibers 514, such as a first fiber 520, a second fiber 526, a third fiber 528, and a fourth fiber 530. In this exemplary embodiment, the feed spacer 120 may include four layers. Although four fibers are depicted in each layer 420, 450, 480, and 510, generally numerous fibers are present in each layer 420, 450, 480, and 510, as described above.

Usually, the plurality of fibers 424 of the first layer 420 are arranged with respect to their lengths in a substantially parallel manner. Often, each fiber is substantially identical with a uniform diameter. As such, only a single fiber 430 is described in detail. The fiber 430 can have a length 432 and a diameter 434. Usually, a ratio of the diameter 434 of the fiber 430 to the height 126 of the channel 124, as depicted in FIG. 2, is about 0.15:1-about 0.35:1, even about 0.25:1-0.35:1, such as about 0.25:1. Typically, the fiber 430 is skewed with respect to its length 432 to the bulk flow 174. In other exemplary embodiments, the length 432 of the fiber 460 can be orientated about 22-about 68°, desirably about 35-about 55°, such as about 45°, with respect to the internal bulk flow 174.

Sometimes, the plurality of fibers 454 of the second layer 450 are arranged with respect to their lengths in a substantially parallel manner. Often, each fiber is substantially identical with a uniform diameter. As such, only a single fiber 460 is described in detail. Typically, the fiber 460 has about the same length and diameter of the fiber 430 of the first layer 420. Generally, the fiber 460 is skewed with respect to its length to the bulk flow 174. In other exemplary embodiments, the length of the fiber 460 can be orientated about 292-about 338°, desirably about 305-about 325°, such as about 315°, with respect to the internal bulk flow 174, or about 45-about 135°, desirably about 80-about 100°, such as about 90°, with respect to at least one fiber 424 of the first layer 420.

In another exemplary embodiment, the plurality of fibers 424 in the first layer 420 can have substantially uniform diameters with respect to one another as well as the plurality of fibers 454 of the second layer 450 can have substantially uniform diameters with respect to one another. Moreover, the diameters of the plurality of fibers 424 of the first layer 420 can be substantially identical to the diameters of the plurality of fibers 514 of the fourth layer 510 and the diameters of the plurality of fibers 454 of the second layer 450 can be substantially identical to the diameters of the plurality of fibers 484 of the third layer 480. Typically, the diameter of a fiber 460 representative of the fiber diameters of the second layer 450 or the third layer 480 can have a larger diameter than the diameter of a fiber 430 representative of the fiber diameters of the first layer 420 or the fourth layer 510. Generally, the ratio of the diameters of the fibers from the first layer 420 and the fourth layer 510 to the height 126 of the channel 124 is no more than about 0.3:1 and the ratio of the diameters of the fibers from the second layer 450 and the third layer 480 to the height 126 of the channel 124 is at least about 0.25:1.

Generally, the plurality of fibers 484, namely, the first fiber 490, the second fiber 496, the third fiber 498, and the fourth fiber 500, of the third layer 480 correspond and are aligned with the plurality of fibers 424, namely, the first fiber 430, the second fiber 436, the third fiber 438, and the fourth fiber 440, of the first layer 420. Thus, the fibers 484 of the third layer 480 are generally aligned with the fibers 424 of the first layer 420. Moreover, the plurality of fibers 514, namely, the first fiber 520, the second fiber 526, the third fiber 528, and the fourth fiber 530, of the fourth layer 510 correspond and can be generally aligned with the plurality of fibers 454, namely, the first fiber 460, the second fiber 466, the third fiber 468, and the fourth fiber 470, of the second layer 450. Thus, the fibers 514 in the fourth layer 510 are generally aligned with the fibers 454 of the second layer 450.

It should be understood that angles of the fiber lengths of the layers 420, 450, 480, and 510 relative to the bulk flow 174 can be reversed. As an example, the plurality of fibers 424 with respect to their lengths can be orientated about 292-about 338°, desirably about 305-about 325°, such as about 315°, with respect to the internal bulk flow 174, and the plurality of fibers 454 with respect to their lengths can be orientated about 22-about 68°, desirably about 35-about 55°, such as about 45°, with respect to the internal bulk flow 174. Additionally, the angle of the fiber lengths of the second layer 450 as compared to the fiber lengths of the first layer 420 can be about 135-about 45°, desirably about 100-about 80°, depending on which side the angle is measured as a fiber from the second layer 450 crosses a fiber of the first layer 420. Generally, the plurality of fibers 454 of the second layer 450 only touches the plurality of fibers 424 and 484 of the first and third layers 420 and 480, and the plurality of fibers 484 of the third layer 480 only touches the plurality of fibers 454 and 514 of the second and fourth layers 450 and 510. The touching fibers can be fused to prevent layer shifting, as described above. Although the fibers in each layer 420, 450, 480, and 510 have been described as substantially identical, it should be understood that the fibers may be different in each layer. Moreover, the fibers of the layers 420, 450, 480, and 510 may be different from one layer to the next.

Figure 5:
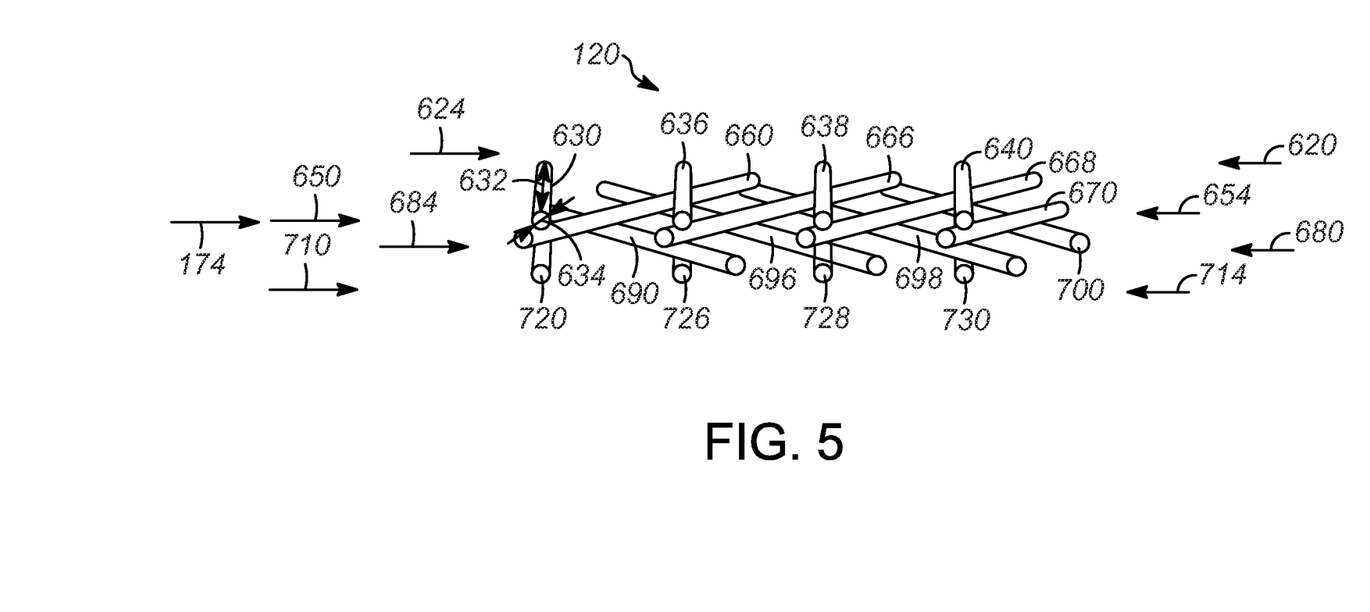
FIG. 5 is a schematic, perspective view of yet another exemplary feed spacer depicting several layers.

Referring to FIG. 5, a further exemplary embodiment of the feed spacer 120 can include a first web or layer 620 including at least one or a plurality of fibers 624, such as a first fiber 630, a second fiber 636, a third fiber 638, and a fourth fiber 640; a second web or layer 650 including at least one or a plurality of fibers 654, such as a first fiber 660, a second fiber 666, a third fiber 668, and a fourth fiber 670; a third web or layer of fibers 680 including at least one or a plurality of fibers 684, such as a first fiber 690, a second fiber 696, a third fiber 698, and a fourth fiber 700; and a fourth web or layer 710 including at least one or a plurality of fibers 714, such as a first fiber 720, a second fiber 726, a third fiber 728, and a fourth fiber 730. In this exemplary embodiment, the feed spacer 120 may include four layers. Although four fibers are depicted in each layer 620, 650, 680, and 710, generally numerous fibers are present in each layer 620, 650, 680, and 710, as described above.

Usually, the plurality of fibers 624 of the first layer 620 are arranged with respect to their lengths in a substantially parallel manner. Often, each fiber is substantially identical with a uniform diameter. As such, only a single fiber 630 is described in detail. The fiber 630 can have a length 632 and a diameter 634. Usually, the ratio of the diameter 634 of the fiber 630 to the height 126 of the channel 124, as depicted in FIG. 2, is about 0.15:1-about 0.35:1, desirably about 0.25-about 0.35:1, such as about 0.25:1. The length 632 of the fiber 630 can be about 80-about 100° with respect to the bulk flow 174. Often, the fiber 630 with respect to its length 632 is substantially perpendicular to the bulk flow 174.

Sometimes, the plurality of fibers 654 of the second layer 650 are arranged with respect to their lengths in a substantially parallel manner. Often, each fiber is substantially identical with a uniform diameter. As such, only a single fiber 660 is described in detail. Typically, the fiber 660 has about the same length and diameter of the fiber 630 of the first layer 620. Generally, the fiber 660 is skewed with respect to its length to the bulk flow 174. In other exemplary embodiments, the length of the fiber 660 can be orientated about 292-about 338°, desirably about 305-about 325°, such as about 315°, with respect to the internal bulk flow 174, and about 112-about 158°, desirably about 125-about 145°, such as about 135°, with respect to the length of the fibers, e.g., the fiber 630, of the first layer 620.

Generally, the plurality of fibers 684 of the third layer 680 are arranged with respect to their lengths in a substantially parallel manner to one another. Often, each fiber is substantially identical with a uniform diameter. As such, only a single fiber 690 is described in detail. The fiber 690 can have substantially the same length and diameter as the fiber 630. Typically, the fiber 690 is skewed with respect to its length to the bulk flow 174. In other exemplary embodiments, the length of the fiber 690 can be orientated about 22-about 68°, desirably about 35-about 55°, such as about 45°, with respect to the internal bulk flow 174, and about 45-about 135°, desirably about 80-about 100°, such as about 90°, with respect to the length of the fiber 660 of the second layer 650. Moreover, the plurality of fibers 714, namely, the first fiber 720, the second fiber 726, the third fiber 728, and the fourth fiber 730, of the fourth layer 710 correspond and can be aligned with the plurality of fibers 624, namely, the first fiber 630, the second fiber 636, the third fiber 638, and the fourth fiber 640, of the first layer 620. Thus, the fibers 714 of the fourth layer 710 are generally aligned on the fibers 624 of the first layer 620. Although the fibers in each layer 620, 650, 680, and 710 have been described as substantially identical, it should be understood that the fibers may be different in each layer. Moreover, the fibers of the layers 620, 650, 680, and 710 may be different from one layer to the next.

In another exemplary embodiment, the plurality of fibers 624 in the first layer 620 can have substantially uniform diameters with respect to one another as well as the plurality of fibers 654 of the second layer 650 can have substantially uniform diameters with respect to one another. Moreover, the diameters of the plurality of fibers 624 of the first layer 620 can be substantially identical to the diameters of the plurality of fibers 714 of the fourth layer 710 and the diameters of the plurality of fibers 654 of the second layer 650 can be substantially identical to the diameters of the plurality of fibers 684 of the third layer 680. Typically, the diameter of a fiber 660 representative of the fiber diameters of the second layer 650 and third layer 680 can have a larger diameter than the diameter of a fiber 630 representative of the fiber diameters of the first layer 620 and the fourth layer 710. Generally, the ratio of the diameters of the fibers from the first layer 620 and the fourth layer 710 to the height 126 of the channel 124 is no more than about 0.3:1 and the ratio of the diameters of the fibers from the second layer 650 and the third layer 680 to height 126 of the channel 124 is at least about 0.25:1.

It should be understood that angles of the fiber lengths of the layers 650 and 680 relative to the bulk flow 174 can be reversed. As an example, the plurality of fibers 654 with respect to their lengths can be orientated about 22-about 68°, desirably about 35-about 55°, such as about 45°, with respect to the internal bulk flow 174, and the plurality of fibers 684 with respect to their lengths can be orientated about 292-about 338°, desirably about 305-about 325°, such as about 315°, with respect to the internal bulk flow 174. Additionally, the angle of the fiber lengths of the third layer 680 as compared to the fiber lengths of the second layer 650 can be about 135-about 45°, desirably about 100-about 80°, depending on which side the angle is measured, as a fiber from the third layer 680 crosses a fiber of the second layer 650. Generally, the plurality of fibers 654 of the second layer 650 only touches the plurality of fibers 624 and 684 of the first and third layers 620 and 680, and the plurality of fibers 684 of the third layer 680 only touches the plurality of fibers 654 and 714 of the second and fourth layers 650 and 710. The touching fibers can be fused to prevent layer shifting, as described above.

The multilayer feed spacers disclosed herein can improve feed mixing with little effect on feed-side pressure drop, decrease feed-side pressure drop with little effect on feed mixing, or a combination of both. Although not wanting to be bound by theory, this result is obtained by using smaller diameter fibers in the multilayer feed spacer as compared to standard two-layer feed spacer. Thus, a feed channel with a specific height is created. Generally, three or more layers of smaller diameter fibers have less total cross-sectional area than two layers of larger diameter fibers. As a consequence, a multilayer feed spacer may block less of the feed channel cross-sectional area. Moreover, the lower resistance from the fibers may lead to a lower pressure drop through the feed channel. In addition, more fiber layers can lead to a more tortuous flow path, and this allows multilayer feed spacers to have similar or even greater flow turbulence than that of comparable two-layer feed spacers. An added benefit of multilayer feed spacers is that fiber diameter in each of the layers does not need to be the same.

Moreover, the middle layer or layers may contain fibers with larger diameters than those on the top and bottom of the feed spacer. This allows flow to be forced closer to the membrane, increasing velocities near the membrane surface. Depending on the desired outcome, parameters of multilayer feed spacers can be adjusted to increase feed turbulence further with an increase in pressure drop that brings the previously reduced pressure drop back to a level comparable with the two-layer feed spacer pressure drop.

Multilayer feed spacers can be assembled from three or more layers of fibers to make a single feed spacer. This allows less processing steps than would be required to combine multiple two-layer feed spacers in each feed channel during membrane separation element assembly, and it prevents layer shifting, as described above. As an aside, the sum of the ratios of the fiber diameters to the channel height may exceed one. In other words, the sum of the diameter of a fiber from each layer in a feed spacer may exceed the height 126 of the channel 124. The sum may exceed the channel height due to overlapping and compaction of the fibers.

Generally, the multilayer feed spacers can be used to decrease feed side pressure drop in membrane elements while maintaining or improving membrane selectivity and/or permeance. These spacers are useful in membranes for gas separations including, but not limited to, acid gas removal from natural gas, helium separation from natural gas, hydrogen separation from hydrocarbons, hydrogen separation from carbon oxides, such as carbon monoxide and/or carbon dioxide, hydrogen separation from nitrogen, oxygen separation from nitrogen, carbon dioxide separation from nitrogen, noncryogenic separation of air to form nitrogen gas and oxygen gas, and alkenes separation from alkanes. The feed spacers may be used in other applications, including vapor or liquid separations, such as water separation from ethanol, water separation from propanol, xylene isomer separations, alkenes separation from linear and/or branched alkanes, and one or more sulfur compounds separation from one or more hydrocarbons.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by mole, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A membrane separation element, comprising:
A) a membrane sheet; and
B) a feed spacer positioned adjacent to the membrane sheet, and comprising:
 1) a first layer comprising a plurality of fibers wherein each fiber of the plurality of fibers has a diameter and a length, and the fibers of the first layer are arranged substantially parallel with respect to their lengths to one another and positioned with respect to their lengths at a skewed angle to a bulk flow;
 2) a second layer comprising a plurality of fibers wherein each fiber of the plurality of fibers has a diameter and a length, and the fibers of the second layer are arranged substantially parallel with respect to their lengths to one another and positioned with respect to their lengths to offset by about 100 to about 80° at least one fiber of the first layer; and
 3) a third layer comprising a plurality of fibers wherein each fiber of the plurality of fibers has a diameter and a length, and the respective lengths of the plurality of fibers of the third layer are generally aligned with the respective lengths of the plurality fibers of the first layer;
 wherein the plurality of fibers of the second layer only touches the plurality of fibers of the first and third layers.

2. The membrane separation element of claim 1, wherein the feed spacer further comprises a fourth layer comprising a plurality of fibers wherein each fiber of the plurality of fibers has a diameter and a length, and the respective lengths of the plurality of fibers of the fourth layer are generally aligned with the respective lengths of the plurality of fibers of the second layer.

3. The membrane separation element of claim 1, wherein each fiber of the plurality of fibers of the first layer has a substantially uniform diameter and each fiber of the plurality of fibers of the second layer has a substantially uniform diameter and the fiber diameter of the second layer is about twice the fiber diameter of the first layer.

4. The membrane separation element of claim 1, wherein the feed spacer comprises an edge defining a feed channel height, and a ratio of the fiber diameter of the fibers of the first and third layers to the feed channel height is no more than 0.4:1, and a ratio of the fiber diameter of the fibers of the second layer to the feed channel height is at least 0.3:1 wherein the fiber diameter of the second layer is larger than the fiber diameter of the first layer or the third layer.

5. The membrane separation element of claim 2, wherein the plurality of fibers of the first layer, the plurality of fibers of the second layer, the plurality of fibers of the third layer, and the plurality of fibers of the fourth layer have a substantially uniform diameter.

6. The membrane separation element of claim 2, wherein the feed spacer comprises an edge defining a feed channel height, and a ratio of the fiber diameter of the first and fourth layers to the feed channel height is no more than about 0.3:1, and a ratio of the fiber diameter of the second and third layers to the feed channel height is at least about 0.25:1 wherein the fiber diameter of the second or third layer is larger than the fiber diameter of the first layer or the fourth layer.

7. The membrane separation element of claim 1, wherein the feed spacer comprises at least one of polyethylene and polypropylene.

8. The membrane separation element of claim 2, wherein the plurality of fibers of the third layer only touches the plurality of fibers of the second and fourth layers.

9. The membrane separation element of claim 1, wherein the membrane sheet is a first membrane sheet and the membrane separation element comprises a second membrane sheet, and the first membrane sheet is positioned adjacent to the first layer of the feed spacer and the second membrane sheet is positioned adjacent to the third layer of the feed spacer.

10. The membrane separation element of claim 2, wherein the membrane is a first membrane and the membrane separation element comprises a second membrane, and the first membrane is positioned adjacent to the first layer of the feed spacer and the second membrane is positioned adjacent to the fourth layer of the feed spacer.

* * * * *